US007972030B2

(12) United States Patent
Li

(10) Patent No.: US 7,972,030 B2
(45) Date of Patent: Jul. 5, 2011

(54) LIGHT EMITTING DIODE (LED) BASED LIGHTING SYSTEMS

(75) Inventor: Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 11/714,464

(22) Filed: Mar. 5, 2007

(65) Prior Publication Data

US 2008/0218992 A1 Sep. 11, 2008

(51) Int. Cl.
*F21S 4/00* (2006.01)
*F21V 21/00* (2006.01)

(52) U.S. Cl. .................... 362/249.02; 362/84; 362/183; 362/194; 362/260; 362/800; 257/98

(58) Field of Classification Search .................. 362/260, 362/800, 84, 183, 249.02, 294, 545; 257/98
See application file for complete search history.

(56) References Cited

U.S. PATENT DOCUMENTS 5,908,235 A * 6/1999 Petrozello et al. ............ 362/260
6,120,909 A 9/2000 Bojarczuk, Jr. et al.
6,466,135 B1 10/2002 Srivastava et al.
6,555,958 B1 4/2003 Srivastava et al.
7,192,161 B1 * 3/2007 Cleaver et al. ................ 362/260
7,246,923 B2 7/2007 Conner
7,355,284 B2 * 4/2008 Negley .......................... 257/778
7,549,782 B2 * 6/2009 Ng et al. ....................... 362/555
2001/0033483 A1 10/2001 Moore
2004/0150991 A1 * 8/2004 Ouderkirk et al. .............. 362/84
2004/0212993 A1 * 10/2004 Morgan et al. ................ 362/231
2004/0228115 A1 * 11/2004 Jacobson et al. ................ 362/84
2005/0200271 A1 9/2005 Juestel et al.
2007/0030666 A1 * 2/2007 Cohen ............................ 362/84
2007/0058357 A1 * 3/2007 Yamaguchi et al. ............ 362/84

* cited by examiner

*Primary Examiner* — Stephen F Husar
(74) *Attorney, Agent, or Firm* — Fliesler Meyer LLP

(57) ABSTRACT

A lighting system comprises at least one excitation source (5), preferably an LED, operable to generate and radiate excitation radiation of a first wavelength ($\lambda_1$); a shade (4) configured to at least in part surround the at least one source (5) and remotely located thereto; and at least one phosphor (16) provided in or on at least a part of the shade (4), wherein the phosphor (16) emits radiation of a different wavelength in response to incident excitation radiation. The phosphor can be provided on a part of an outer or inner surface of the shade. Alternatively, or in addition, the phosphor is incorporated within the shade. The lighting system finds particular application as a hanging, a desk, a floor standing, a wall mountable, a spot, an outdoor or an accent lighting fixture.

39 Claims, 5 Drawing Sheets

LIGHT EMITTING DIODE (LED) BASED LIGHTING SYSTEMS

BACKGROUND OF THE INVENTION

1. Field of the Invention

The invention relates to light emitting diode based lighting systems and in particular to systems in which a phosphor (photo luminescent) material is utilized to generate a desired color of light.

2. Description of the Related Art

The introduction of the solid-state semiconductor devices such as semiconductor light emitting diodes (LEDs) has allowed a new generation of lighting systems to come into existence. Today, lighting fixture designs utilizing LEDs are limited to systems in which an LED (or an array of LEDs), replaces conventional light sources such as incandescent bulbs and fluorescent lamps. As is known with conventional lighting sources a lamp or light shade is used to prevent direct viewing of the light source and for aesthetic considerations. Often the shade is made from a translucent material, such as card, woven material or a plastics material, or from glass. Moreover, the shade can be made of a colored material and acts as a filter to impart a desired color to light transmitted by the shade.

In order to produce a selected color of emitted light, LEDs often incorporate a phosphor layer whose light, emitted in response to an excitation radiation (light) from the LED, combines with light from the LED to produce the selected color of emitted light. It is common in such lighting systems to incorporate further elements such as a light reflection planes, light diffusing components, and color filters.

Typically the phosphor is incorporated in the LED chip package during fabrication of the LED and in close proximity to, or in contact with a light emitting surface of the LED chip. Often, the phosphor layer is coated directly onto the LED to achieve a desired intensity and color of generated light. As disclosed in our co-pending U.S. patent application Ser. No. 11/640,533, the content of which is hereby incorporated by way of reference thereto, the phosphor can also be provided on a surface of an optical component or integrally incorporated into the component, typically a lens, for ease of fabrication of the LED package. The present invention arose in an endeavor to provide an improved lighting system which is based entirely on solid-state components, but which is enhanced by providing greater flexibility in generated light output.

SUMMARY OF THE INVENTION

According to the present invention there is provided a lighting system comprising: at least one excitation source operable to generate and radiate excitation radiation of a first wavelength; a shade configured to at least in part surround the at least one source and located remotely thereto and at least one phosphor provided in at least a part of the shade, wherein the phosphor emits radiation of a different wavelength in response to incident excitation radiation. A particular advantage of the present invention is in the use of a phosphor which enhances the efficiency in terms of brightness for a given LED input power level as compared to known lighting system which filter (selectively block) selected colors of transmitted light.

In the context of the present invention the shade is located remotely to the excitation source and is configured such that excitation energy travels, propagates in free-space (that is it is not guided by an optical medium), a distance of at least one centimeter from the excitation source to the shade.

The at least one phosphor can be provided on at least a part of an inner surface of the shade. Alternatively, or in addition, the at least one phosphor can be provided on at least a part of an outer surface of the shade. In a further embodiment, the at least one phosphor is incorporated within at least a part of the shade. Incorporating the phosphor as an integral part of the shade eases fabrication where the shade is fabricated of a plastics material.

In a another implementation the phosphor can be incorporated in a flexible sheet material which can then be applied to on inserted inside the shade.

The lighting system can further comprise providing first and second phosphors. Such an arrangement enables different colors of light to be generated for radiation passing through the shade and that passing out an opening in the shade. The first and second phosphors can comprise respective layers or be provided as a mixture in at least one layer or be incorporated as a mixture within the shade.

The excitation source preferably comprises a light emitting diode or a plurality of light emitting diodes. Preferably the LED/s is/are operable to emit radiation of wavelength in a range 300 to 500 nm that is U.V. to blue light.

In another arrangement the lighting system further comprises a reflector configured to reflect excitation radiation towards the at least one phosphor. A reflector increases the intensity of the output light and in the case of a system which utilizes a U.V. radiation source provides protection against damage to the human eye. To dissipate heat generated by the excitation source the lighting system further comprises heat sinking means in thermal communication with the excitation source. In a one arrangement the heat sinking means is fabricated as a part of the lighting fixture.

The present invention finds particular application as a hanging (pendant), a desk, a wall mountable, a ceiling mountable, a spot, an outdoor and an accent lighting fixture. Where the lighting fixture comprises an outdoor lighting fixture, typically a garden lighting fixture or lantern, the system further comprises light sensing means to detect for the presence of ambient light and circuit means for automatically switching the lighting system on when the ambient light falls below a predetermined threshold. Such a lighting arrangement also finds applications for emergency lighting. Moreover, the lighting system further comprises solar power generating means for generating electrical energy to operate the excitation source and to charge one or more batteries for powering the lantern.

According to a further aspect of the invention there is provided a shade for a lighting system of a type comprising at least one excitation source operable to generate and radiate excitation radiation of a first wavelength; the shade being configured to at least in part surround the at least one source and located remotely thereto wherein at least one phosphor is provided in at least a part of the shade. As with the lighting system in accordance with the first aspect of the invention the shade is located remotely to the excitation source and is configured such that excitation energy travels (radiates), propagates in free-space (that is it is not guided by an optical medium), a distance of at least one centimeter from the excitation source to the shade.

The at least one phosphor can be provided on at least a part of an inner or outer surface of the shade or incorporated within at least a part of the shade. Moreover, the shade can further comprise first and second phosphors on at least a part of an inner or/and outer surface of the shade or incorporated within the shade. The first and second phosphors can comprise respective layers or be provided as a mixture in at least one layer.

According to a yet further aspect of the invention there is provided a lighting system comprising: at least one light emitting diode operable to generate and radiate excitation radiation of wavelength 350 to 500 nm; a shade configured to at least in part surround the at least one light emitting diode and located remotely thereto; at least one phosphor provided in at least a part of the shade, wherein the phosphor emits radiation of a different wavelength in response to incident excitation radiation; and solar power generating means, typically a solar cell, for generating electrical energy to operate the light emitting diode. The shade is configured such that excitation energy travels, propagates in free-space (that is it not guided by optical medium), a distance of at least one centimeter from the excitation source to the shade.

In one arrangement the lighting system further comprises light sensing means, for example a photodiode, to detect for the presence of ambient light and circuit means for automatically switching the lighting system on when the ambient light falls below a predetermined threshold. Moreover, the lighting system further comprises a rechargeable power source for powering the lighting system when the ambient light falls below a predetermined threshold, the circuit means being further operable to recharge the rechargeable power source from the solar power generating means.

As with the lighting system in accordance with a first aspect of the invention the at least one phosphor can be provided on at least a part of an inner or outer surface of the shade or be incorporated within at least a part of the shade.

According to a another aspect of the invention there is provided a lighting system comprising: at least one light emitting diode operable to generate and radiate excitation radiation of wavelength 350 to 500 nm; a shade configured to at least in part surround the at least one light emitting diode and located remotely thereto; at least one phosphor provided in at least a part of the shade, wherein the phosphor emits radiation of a different wavelength in response to incident excitation radiation; and power driver circuitry for converting mains electricity to operate the light emitting diode.

According to yet a further aspect of the invention there is provided a lighting system comprising: at least one light emitting diode operable to generate and radiate excitation radiation of wavelength 350 to 500 nm; a shade configured to at least in part surround the at least one light emitting diode and located remotely thereto; at least one phosphor provided in at least a part of the shade, wherein the phosphor emits radiation of a different wavelength in response to incident excitation radiation; and heat sinking means in thermal communication with the at least one light emitting diode.

BRIEF DESCRIPTION OF THE DRAWINGS

In order that the present invention is better understood embodiments of the invention will now be described, by way of example only, with reference to the accompanying drawings in which.

DETAILED DESCRIPTION OF THE INVENTION

Figure 1:
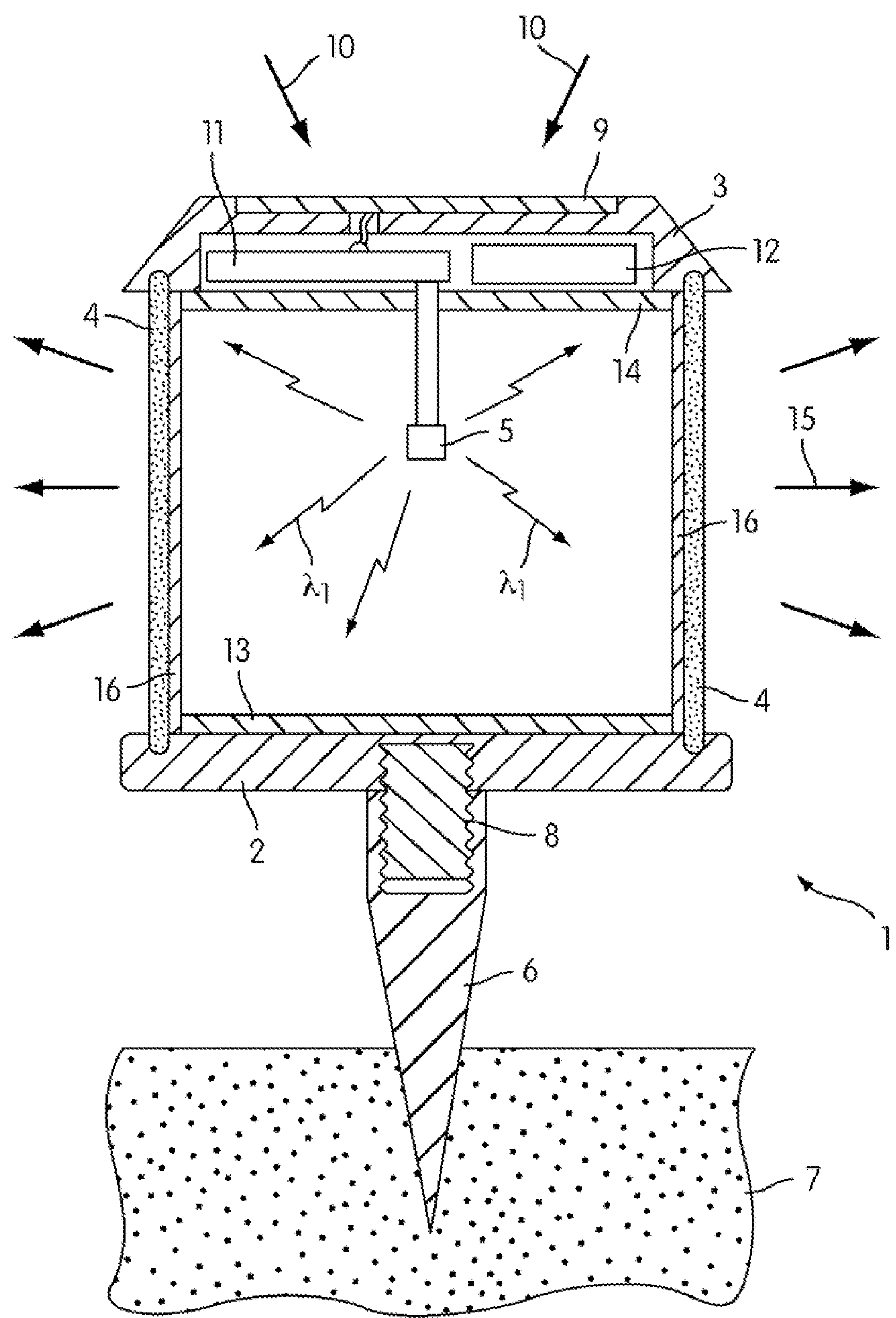
FIG. 1 is a schematic cross-sectional representation of a lighting system in accordance with the present invention which comprises an outdoor lighting fixture.

Referring to FIG. 1 there is shown a schematic cross-sectional representation of a lighting system in accordance with the present invention which comprises an outdoor lighting fixture or solar powered garden lantern 1. The lantern 1 is generally cylindrical in form and comprises a circular base 2, a circular top 3, a translucent hollow cylindrical shade 4 disposed between the base and top and a radiation source 5 mounted within the volume defined by the shade 4 in conjunction with the base 2 and top 3. A spike 6 is secured to on an underside of the base 2 enabling the lantern 1 to be installed by inserting the spike 6 into the ground 7. In the embodiment illustrated the spike 6 is removeably secured to the base 2 by a threaded stud 8 enabling the lantern 1 to be secured to fixtures other than the spike such as a wall bracket etc.

In an outer surface of the top 3 there is provided a solar cell, photovoltaic cell, 9 for operating the lantern from incident ambient light 10. Housed within the top 3 there is a control/drive circuit 11 for operating the lantern 1 and a rechargeable battery 12 for powering the lantern in low ambient light levels. An ambient light sensor (not shown) is provided within the solar cell 9 and is configured to detect when the incident ambient light 10 falls below a predetermined threshold at which point the circuit 11 activates the lantern. The circuit 11 is configured to recharge the battery 12 from the solar cell 9 when the ambient light is above a threshold level.

A respective reflector 13, 14 is provided on the upper and lower surfaces of the base 2 and top 3 to increase the brightness of light 15 generated by the lantern. On an inner curved surface of the shade 4 a layer of phosphor 16 is provided. As is known a phosphor is a photo luminescent material which generates radiation, typically light, when subjected to excitation radiation of a selected wavelength or range of wavelengths. In the embodiment illustrated the excitation radiation source 5 comprises a light emitting diode (LED) or an array of LEDs which is operable to generate excitation radiation of wavelength $\lambda_1$ in a range 300 to 350 nm (ultra violet) or greater than 350 nm, typically in a range 420 nm to 470 nm (blue). Any appropriate phosphor can be used such as for example orthosilicate, silicate and aluminate materials. It is preferable to use an LED 5 which emits blue light rather than U.V. to lessen any likelihood of damage to a user's eye and degradation of the shade material which is conveniently made of a plastics material.

In the context of the present invention a shade is defined as an optical enclosure which at least partially encloses the light source and is located remotely thereto and can be substantially transparent, translucent or opaque. The radiation source 5 is located remote to the surface of the shade 4 (in particular is located remotely to the phosphor) such that excitation energy emitted by the source is radiated, that is propagates in free-space (that is it is not guided by an optical medium), a distance of at least one centimeter from the excitation source to the shade (phosphor). Where the lantern is required to generate white light 15, a yellow (650 nm) emissive phosphor 16 is provided. The phosphor which typically comprises a fine powder can be coated on the shade by painting or other deposition techniques as part of an epoxy resin or silicone or other binder material. The thickness of the phosphor layer 16 and concentration of the phosphor powder within the binder determines the color of light emitted by the lantern. In an alternative arrangement, the phosphor can be incorporated into a polymer material or silicone and fabricated as a flexible sheet, which is then inserted inside of the shade. It will be appreciated that the color of light 15 emitted by the lantern can be controlled by appropriate selection of the phosphor composition.

Figure 2A:
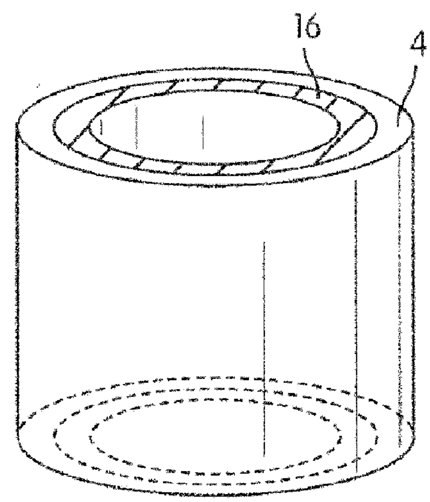
FIGS. 2*a* to 2*c* are schematic representations of optical enclosures arrangements, shades, for use in the lighting fixture of FIG. 1.
Figure 2B:
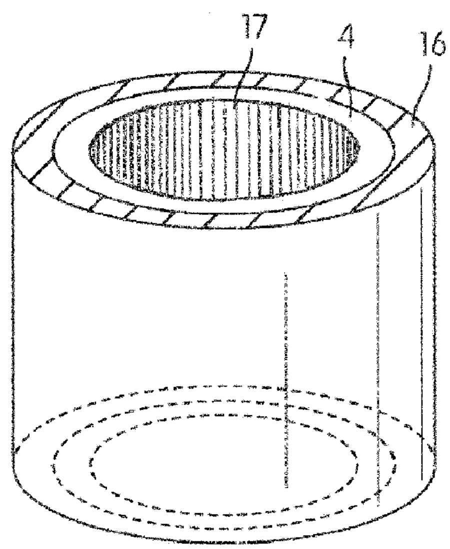
Figure 2C:
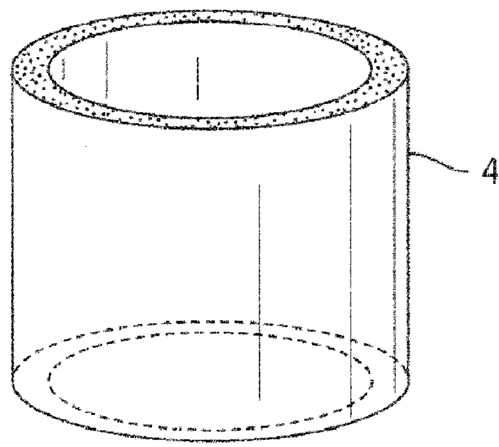

Referring to FIGS. 2*a* to 2*c* there are shown schematic representations of alternative shade arrangements 4, for use in the lantern of FIG. 1. Each of the shade arrangements illustrated are hollow cylindrical in form though it will be appreciated that the can take any form such as polygonal and multi-faceted forms. FIG. 2*a* shows a shade in which the phosphor 16 is provided as a layer on the inner curved surface of the shade 4. The shade can be fabricated from any translucent or transparent material such as glass or a plastics material. FIG. 2*b* shows a shade in which the phosphor 16 is provided on an outer curved surface of the shade 4. Advantageously the inner curved surface of the shade includes some form of surface topology, such as longitudinal ribs/grooves 17 or a roughing of the surface to assist coupling of light from the LED into the shade to thereby maximize light output from the lantern. Moreover, such a surface topology can alternatively or in addition be applied to the outer surface of the shade irrespective of where the phosphor is provided. FIG. 2*c* illustrates a shade 4 in which the phosphor is integrally incorporated in (dispersed throughout) the shade material during fabrication of the shade. Typically the shade in such an arrangement comprises a plastics material.

Figure 3:
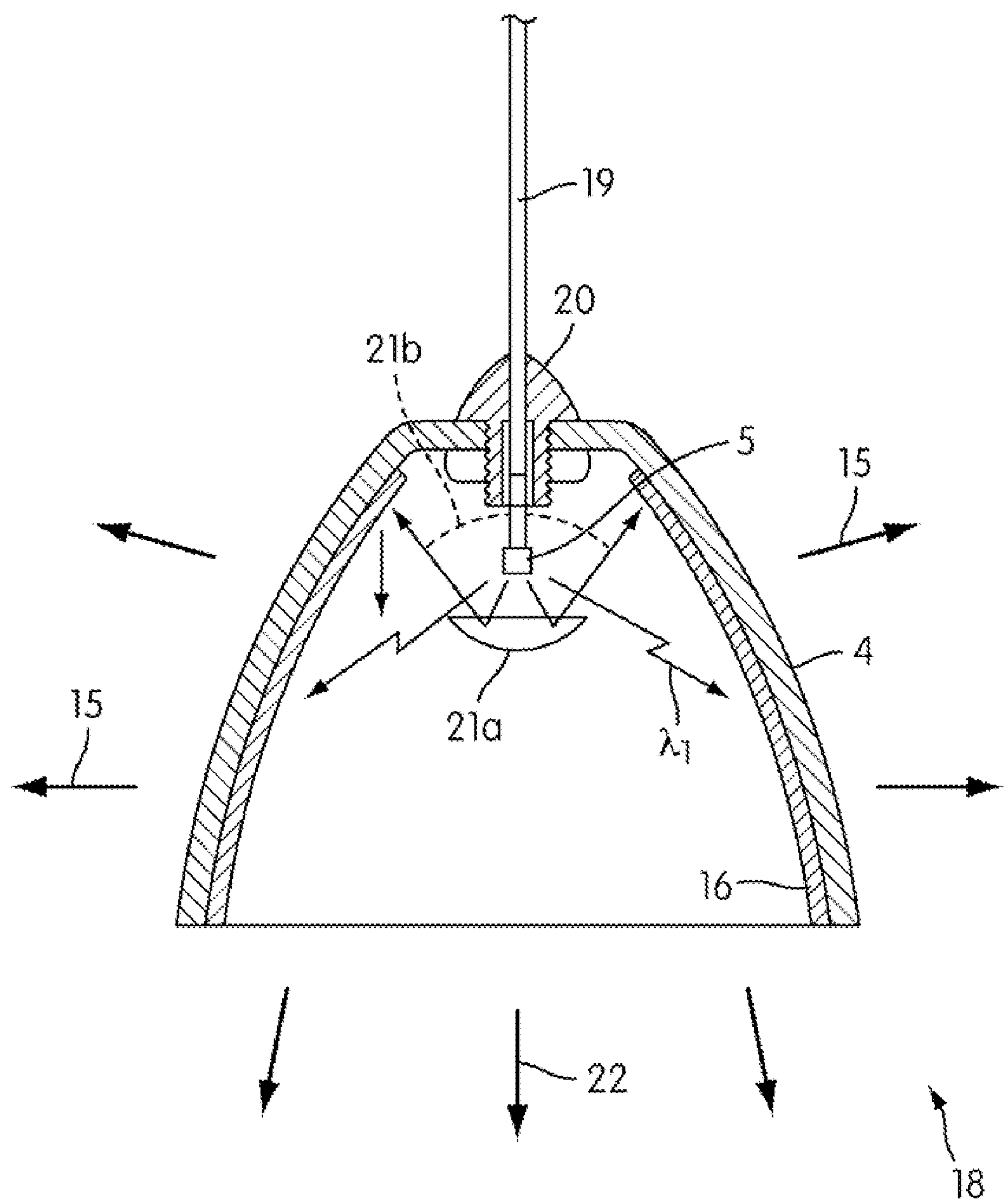
FIG. 3 is a schematic cross-sectional representation of a lighting system in accordance with the present invention which comprises a hanging, or pendant, lighting fixture.

Referring to FIG. 3 there is shown a schematic cross-sectional representation of a lighting system in accordance with the present invention which comprises a hanging, or pendant, lighting fixture 18. Throughout this specification the same reference numerals are used to denote like parts.

The hanging fixture 18 is suspended by a cable 19 which is secured to the shade 4 by a threaded mount 20. The mount 20 can include a cable clamp (not shown) for maintaining a fixed relation between the cable 19 and mount 20. In the embodiment illustrated the phosphor 16 is provided on an inner surface of the shade 4 which is made of a translucent material. As illustrated the LED 5 can be directly connected to the cable 19 or a connector arrangement can be provided as part of the mount. A parabolic reflector 21 is provided in one of two alternative arrangements indicated as 21*a* and 21*b* in FIG. 3, the latter of which the reflector is indicated by a broken line. In the first arrangement the reflector 21*a* is provided below the LED 5 and is arranged to reflect emitted radiation from the LED towards the shade 4 and thereby prevent direct emission of radiation from the LED. Such an arrangement is particularly advantageous to ensure a uniform color of emitted radiation 22 from the lighting fixture. Moreover, when a U.V. emitting LED is used, the reflector further prevents damage to a user's eye and eliminates the need for a U.V. filter across the open end of the shade. In the second arrangement the reflector 21*b* is provided above the LED 5 and is arranged to reflect radiation from the open end of the lighting fixture.

In one embodiment, which it is intended to generate white light 22 in a downward direction and a different colored light from the shade 15, a blue LED is utilized with a yellow phosphor and the reflector arrangement 21*b*. Blue light generated by the LED 5 which is radiated in a downward direction in combination with yellow light generated by the phosphor 16 gives emitted radiation 22 which appears white in color to the eye. In addition light transmitted through the shade 15 will appear more yellow in color than the white light 22. The exact color of light emitted by the shade will depend on the thickness and density of the phosphor layer 16. Moreover it will be appreciated that the color of light generated by the shade can be tailored by providing one or more different color phosphors such as for example green, orange or red phosphors.

In an alternative arrangement, when it is intended to generate light 15, 22 of substantially a single color, a U.V./blue LED is utilized with a yellow phosphor and the reflector arrangement 21*a*. U.V./blue light generated by the LED 5 which is radiated in a downward direction is reflected back toward the phosphor rather than being directly emitted by the lighting arrangement. The reflected light excites the phosphor emitting colored light 22, 15 which is emitted from the lighting arrangement.

Figure 4:
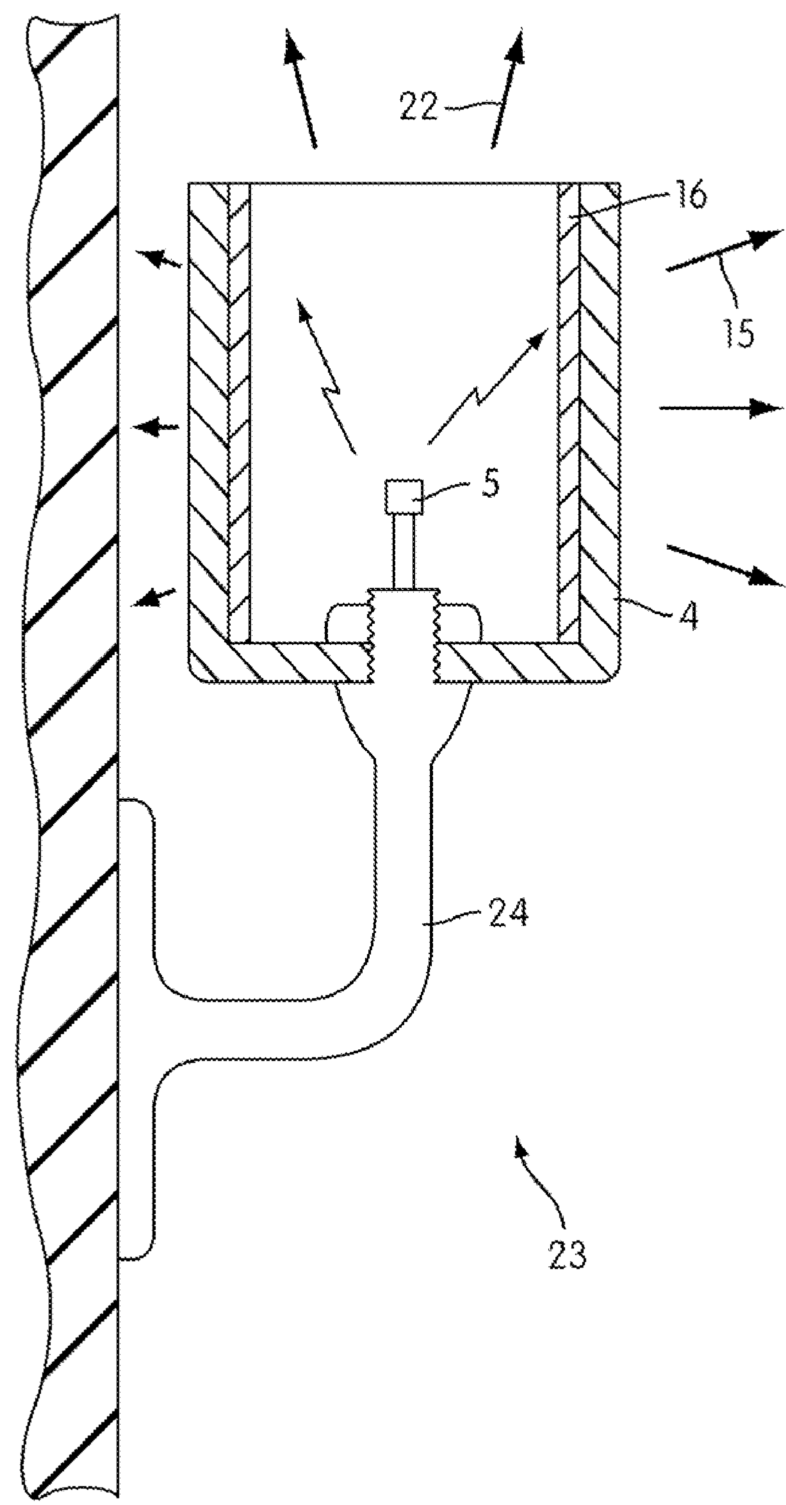
FIG. 4 is a schematic cross-sectional representation of a lighting system in accordance with the present invention which comprises a wall, or sconce, lighting fixture.

Referring to FIG. 4 there is shown is a schematic cross-sectional representation of a lighting system in accordance with the present invention which comprises a wall, or sconce, lighting fixture 23. The lighting fixture 23 comprises a bracket or sconce 24 to which the shade 4 is mounted. In the embodiment illustrated the fixture is configured as an up lighting arrangement though other variants, such as down lighting or back lighting, can be readily implemented by appropriate configuration of the shade 4. As described in relation to the embodiment of FIG. 3 the lighting arrangement can be configured to emit different colored light from light transmitted through the shade and emitted from the opening of the shade. The lighting fixture can include suitable power driver circuitry to enable the fixture to be operated from a mains electricity supply.

Figure 5:
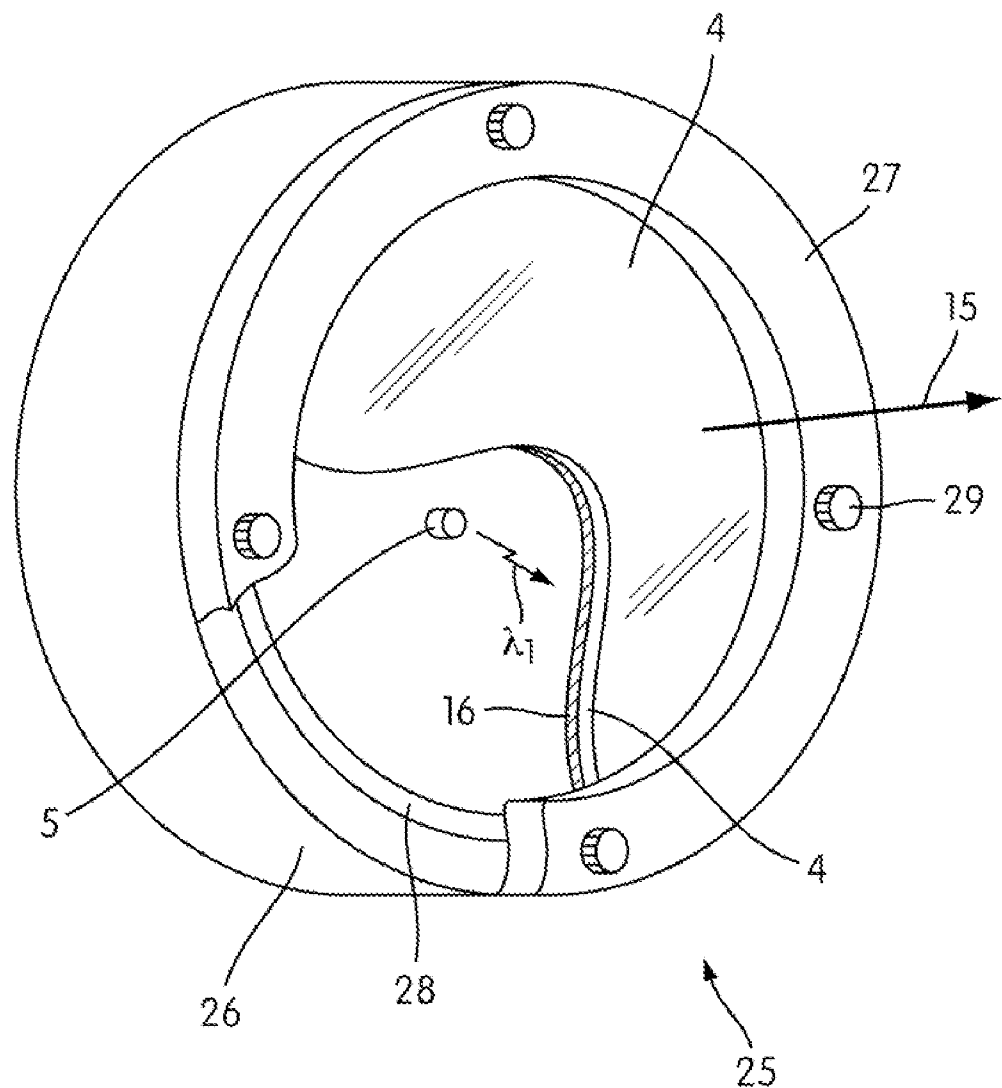
FIG. 5 is a partial cross-sectional perspective representation of a lighting system in accordance with the present invention which comprises a wall, or bulkhead, lighting fixture.

Referring to FIG. 5 there is shown is a is a partial cross-sectional perspective representation of a lighting system in accordance with the present invention which comprises a wall mountable or ceiling mountable, lighting fixture or bulkhead light 25. The fixture comprises a circular housing 26 and detachable front plate 27 which is ring shaped. The housing 26 includes a recess 28 on its inner front face configured for receiving the shade 4 which in the embodiment illustrated comprises a circular plate. The front plate 27 is secured to the housing 26 by screw fixtures 29 and the housing 26 advantageously includes a reflective inner surface (not shown) for reflecting light towards the shade 4. The housing 26 can be made of an opaque material such as a metal or plastics material to ensure light 15 is only emitted from the shade 4. In an alternative arrangement the housing is made of a translucent/transparent material which includes a different phosphor material such that the lighting fixture 25 emits a different colored light around its periphery.

It will be readily apparent to those skilled in the art that modifications can be made to the lighting arrangements disclosed without departing from the scope of the invention. For example whilst exemplary implementations in the form of a garden lantern, pendant lighting system and wall lighting systems have been described the invention can be readily applied to other lighting systems such as for example: desk, ceiling, flush, floor standing, spot, accent and up lighting fixtures.

Moreover, it will be appreciated that any of the lighting fixtures can be powered by a solar cell, a battery or from a mains supply. In the case of the latter the lighting fixture advantageously further includes a power converter, such as a solid state switched mode power supply, to convert the mains electricity from 110-220 volts to a 3.3 volt 20 mA for driving the LED. In addition the lighting system advantageously further incorporates a heat sink, for example as a part of the fixture, which is in thermal communication with the LED to provide cooling of the LED. Furthermore it will be apparent to those skilled in the art that the shade can be made in any form to meet a required application such as for example: being closed in form, e.g. spherical, such as to substantially enclose the excitation source, polygonal in form or multi-faceted in form.

What is claimed is:

1. A lighting fixture comprising: at least one light emitting diode operable to generate and radiate blue excitation light of wavelength 420 nm to 470 nm; a shade located remotely to the at least one light emitting diode and configured to at least in part surround the at least one light emitting diode to thereby prevent at least in part direct viewing of the at least one light emitting diode, wherein the shade is configured such that excitation light travels in free-space a distance of at least one centimeter from the light emitting diode to the shade; and at least one phosphor incorporated in a light transmissive flexible sheet and the sheet inserted inside or applied to the shade, wherein the phosphor emits light of a different wavelength in response to incident excitation light, and wherein the combined light from the light emitting diode and the phosphor generate a desired color of light that appears white in color to the eye.

2. The lighting fixture of claim 1, and further comprising first and second phosphors selected from the group consisting of: being incorporated in the light transmissive flexible sheet and the flexible sheet inserted inside the shade; being incorporated in the light transmissive flexible sheet and the flexible sheet applied to the shade; and a combination thereof.

3. The lighting fixture of claim 2, wherein the first and second phosphors comprise respective layers.

4. The lighting fixture of claim 2, wherein the first and second phosphors are provided as a mixture in at least one layer.

5. The lighting fixture of claim 1, and further comprising a reflector configured to reflect excitation light towards the at least one phosphor.

6. The lighting fixture of claim 1, and further comprising a heat sink in thermal communication with the at least one light emitting diode.

7. The lighting fixture of claim 1, wherein the lighting fixture is configured from the group consisting: a hanging, a desk, a floor standing, a wall mountable, a ceiling mountable, a spot, an outdoor and an accent lighting fixture.

8. The lighting fixture of claim 1, and further comprising a light sensor operable to measure incident ambient light and a control circuit operable to activate the lighting fixture when the ambient light falls below a predetermined threshold.

9. The lighting fixture of claim 8, and further comprising a solar cell for generating electrical energy to operate the at least one light emitting diode.

10. The lighting fixture of claim 1, wherein light emitted from an opening in the shade is of a first color and light emitted through the shade is of a second different color.

11. The lighting fixture of claim 10, wherein the light emitted from the opening in the shade appears white in color.

12. The lighting fixture of claim 1, wherein the shade further comprises a surface topology to aid coupling of excitation light into the shade.

13. A shade for a lighting fixture of a type comprising at least one light emitting diode operable to generate and radiate blue excitation light of wavelength 420 nm to 470 nm; the shade being located remotely to the at least one light emitting diode and configured to at least in part surround the at least one light emitting diode to thereby prevent at least in part direct viewing of the at least one light emitting diode, wherein the shade is configured such that excitation light travels in free-space a distance of at least one centimeter from the light emitting diode to the shade and at least one phosphor incorporated in a light transmissive flexible sheet and the sheet inserted inside or applied to the shade, and wherein the combined light from the light emitting diode and phosphor generate a desired color of light that appears white in color to the eye.

14. The shade of claim 13, and further comprising first and second phosphors selected from the group consisting of: being incorporated in the light transmissive flexible sheet and the sheet inserted inside the shade; being incorporated in the light transmissive flexible sheet and the sheet applied to the shade; and a combination thereof.

15. The shade of claim 14, wherein the first and second phosphors comprise respective layers.

16. The shade of claim 14, wherein the first and second phosphors are provided as a mixture in at least one layer.

17. The shade of claim 13, wherein light emitted from an opening in the shade is of a first color and light emitted through the shade is of a second different color.

18. The shade of claim 17, wherein the light emitted from the opening in the shade appears white in color.

19. The shade of claim 13, wherein the shade is selected from the group consisting of being: cylindrical, spherical, polygonal, multifaceted and generally paraboloid in form.

20. The shade of claim 13, wherein the shade further comprises a surface topology to aid coupling of excitation light into the shade.

21. A lighting fixture comprising: at least one light emitting diode operable to generate and radiate blue excitation light of wavelength 420 to 470 nm; a shade located remotely to the at least one light emitting diode and configured to at least in part surround the at least one light emitting diode to thereby prevent at least in part direct viewing of the at least one light emitting diode, wherein the shade is configured such that excitation light travels in free-space a distance of at least one centimeter from the light emitting diode to the shade; at least one phosphor incorporated in a light transmissive flexible sheet and the sheet inserted inside or applied to the shade, wherein the phosphor emits light of a different wavelength in response to incident excitation light; and a solar cell for generating electrical energy to operate the light emitting diode, and wherein the combined light from the light emitting diode and phosphor generate a desired color of light that appears white in color to the eye.

22. The lighting fixture of claim 21, and further comprising a light sensor operable to measure incident ambient light and a control circuit operable to activate the lighting fixture when the ambient light falls below a predetermined threshold.

23. The lighting fixture of claim 22, and further comprising a rechargeable power source for powering the lighting fixture when the ambient light falls below the predetermined threshold, the control circuit being further operable to recharge the rechargeable power source from the solar cell.

24. The lighting fixture of claim 21, and further comprising first and second phosphors selected from the group consisting of: being incorporated in the light transmissive flexible sheet and the sheet inserted inside the shade; being incorporated in the light transmissive flexible sheet and the sheet applied to the shade; and a combination thereof.

25. The lighting fixture of claim 24, wherein the first and second phosphors comprise respective layers.

26. The lighting fixture of claim 24, wherein the first and second phosphors are provided as a mixture in at least one layer.

27. The lighting fixture of claim 21, wherein the shade is selected from the group consisting of being: cylindrical, spherical, polygonal, multifaceted and generally paraboloid in form.

28. The lighting fixture of claim 21, wherein the shade further comprises a surface topology to aid coupling of excitation light into the shade.

29. A lighting fixture comprising: at least one light emitting diode operable to generate and radiate blue excitation light of wavelength 420 to 470 nm; a shade located remotely to the at least one light emitting diode and configured to at least in part surround the at least one light emitting diode and located remotely thereto to thereby prevent at least in part direct viewing of the at least one light emitting diode and wherein the shade is configured such that excitation light travels in free-space a distance of at least one centimeter from the light emitting diode to the shade; at least one phosphor incorporated in a light transmissive flexible sheet and the sheet inserted inside or applied to the shade, wherein the phosphor emits light of a different wavelength in response to incident excitation light; and a heat sink in thermal communication with the at least one light emitting diode, and wherein the combined light from the light emitting diode and phosphor generate a desired color of light that appears white in color to the eye.

30. The lighting fixture of claim 29, wherein the shade is selected from the group consisting of being: cylindrical, spherical, polygonal, multifaceted and generally paraboloid in form.

31. The lighting fixture of claim 29, wherein the shade further comprises a surface topology to aid coupling of excitation light into the shade.

32. A lighting fixture comprising: at least one light emitting diode operable to generate and radiate blue excitation light of wavelength 420 nm to 470 nm; a shade located remotely to the at least one light emitting diode and configured to at least in part surround the at least one light emitting diode to thereby prevent at least in part direct viewing of the at least one light emitting diode wherein the shade has an opening through which light can be emitted directly from the fixture without having to pass through the shade and at least one phosphor provided on at least a part of the shade, wherein the phosphor emits light of a different wavelength in response to incident excitation light, and wherein light emitted from the opening in the shade is of a first color and light emitted through the shade is of a second different color.

33. The lighting fixture of claim 32, wherein the light emitted from the opening comprises the combined light from the light emitting diode and phosphor.

34. The lighting fixture of claim 33, wherein light emitted from the opening is configured to appear white in color.

35. The lighting fixture of claim 32, wherein the shade is configured such that excitation light travels in free-space a distance of at least one centimeter from the light emitting diode to the shade.

36. The lighting fixture of claim 32, wherein the shade is selected from the group consisting of being: cylindrical, spherical, polygonal, multifaceted and generally paraboloid in form.

37. The lighting fixture of claim 32, wherein the shade further comprises a surface topology to aid coupling of excitation light into the shade.

38. The lighting fixture of claim 32, wherein the at least one phosphor is selected from the group consisting: being provided on at least a part of an inner surface of the shade; being provided on at least a part of an outer surface of the shade; being incorporated within at least a part of the shade; being incorporated in a light transmissive flexible sheet and the sheet inserted inside the shade; being incorporated in a light transmissive flexible sheet and the sheet applied to the shade; and a combination thereof.

39. The lighting fixture of claim 32, and further comprising a reflector configured to reflect excitation light towards the at least one phosphor.

* * * * *